(12) United States Patent
Wuerger

(10) Patent No.: US 7,425,965 B2
(45) Date of Patent: Sep. 16, 2008

(54) COLOUR CALIBRATION

(75) Inventor: Sophie Wuerger, Cheshire (GB)

(73) Assignee: TruColour Limited, Liverpool (GB)

( * ) Notice: Subject to any disclaimer, the term of this patent is extended or adjusted under 35 U.S.C. 154(b) by 213 days.

(21) Appl. No.: 10/494,690

(22) PCT Filed: Nov. 5, 2002

(86) PCT No.: PCT/GB02/05006

§ 371 (c)(1),
(2), (4) Date: Oct. 13, 2004

(87) PCT Pub. No.: WO03/041395

PCT Pub. Date: May 15, 2003

(65) Prior Publication Data

US 2005/0052344 A1    Mar. 10, 2005

(30) Foreign Application Priority Data

Nov. 6, 2001    (GB) ................. 0126696.4

(51) Int. Cl.
*G09G 5/02* (2006.01)
(52) U.S. Cl. .............. 345/593; 345/594
(58) Field of Classification Search ........... 345/22, 345/72, 83, 88, 549, 593, 594, 595, 690, 345/FOR. 108, FOR. 169, FOR. 212; 358/406, 358/504; 702/85, 86, 90, FOR. 156
See application file for complete search history.

(56) References Cited

U.S. PATENT DOCUMENTS

| | | | | |
|---|---|---|---|---|
| 3,921,163 A * | 11/1975 | Giraud et al. ............ 345/22 |
| 4,206,592 A * | 6/1980 | Maue ..................... 368/233 |
| 5,231,475 A * | 7/1993 | Ritter et al. .............. 348/578 |
| 5,381,349 A | 1/1995 | Winter et al. |
| 5,473,738 A * | 12/1995 | Hamlin et al. ............ 345/594 |
| 6,030,066 A | 2/2000 | Bockman et al. |
| 6,304,278 B1 * | 10/2001 | Coleman .................. 347/110 |
| 6,381,343 B1 * | 4/2002 | Davis et al. .............. 382/112 |
| 6,690,383 B1 * | 2/2004 | Braudaway et al. ........ 345/600 |
| 7,265,778 B2 | 9/2007 | Braun |
| 2003/0063338 A1 * | 4/2003 | Gudaitis et al. ............ 358/519 |

FOREIGN PATENT DOCUMENTS

JP    2001-48794    5/2001

OTHER PUBLICATIONS

Foley, Computer Graphics: Principles and Practice, 1997, Addison-Wesley, Second Edition, pp. 575-595.*
Robert Cowart, Mastering Windows 3.1, 1993, Sybex, Special Edition, pp. 151-156.*
Patent abstracts of Japan, vol. 2000, No. 19, Jun. 5, 2001, JP2001047665.
Patent abstracts of Japan, vol. 2000, No. 9, Oct. 13, 2000, JP2000184220.

* cited by examiner

*Primary Examiner*—Matthew C. Bella
*Assistant Examiner*—Gregory F Cunningham
(74) *Attorney, Agent, or Firm*—Michael Best & Friedrich LLP

(57) ABSTRACT

A method of color calibration, the method comprising for a user's display device: a. displaying a set of color regions each region having a sligtly different color; b. receiving an input from a user, the input indicating which color region is considered by the user to represent a unique hue; c. repeating steps a and b for three different unique hues at different intensities; and d. using the user's selections of unique hues to generate a set of display device color calibration parameters which characterize chromatic properties of the user's display device.

25 Claims, 5 Drawing Sheets

COLOUR CALIBRATION

The present invention relates to colour calibration.

When an image is viewed on a visual display unit (for example a monitor) the appearance of the colours of the image depends upon the characteristics of the visual display unit. For this reason, if the same image were to be viewed on a different visual display unit the appearance of the colours of the image would be different.

There are some instances in which differences between colour appearance is not a particular disadvantage, for example when watching television. In the case of a television program the appearance of colours will in general be sufficiently accurate that a viewer's enjoyment of the program is not compromised. In the case of a television advert, in general the intention of the advert will be to entice the viewer to purchase the item at a later date, usually at a shop. When buying the product the customer (viewer) will be able to see the product itself before deciding whether or not to buy the product. If the colour of the product is an important factor in deciding whether or not to buy the product, the customer will make the decision based upon the colour of the product as seen in the shop; the colour of the product as seen in the television advert is not used to make the decision.

A significant problem arises when a company advertises products on the World Wide Web for direct purchase via the Internet. An image of an item appearing on the monitor of an end-user will have a colour appearance which is different from the actual colour of the item itself. If the colour of the item is an essential feature of the item this can be a serious commercial problem, since the user may decide to purchase the item based upon the colour of the viewed image, and will then be disappointed to find that the colour of the item is not as expected.

It is an object of the present invention to provide colour calibration which overcomes or mitigates the above disadvantage.

According to the invention there is provided a method of colour calibration, the method comprising for a user's display device:
   a. displaying a set of colour regions each region having a slightly different colour;
   b. receiving an input from a user, the input indicating which colour region is considered by the user to represent a unique hue;
   c. repeating steps a and b for three different unique hues at different intensities; and
   d. using the user's selections of unique hues to generate a set of display device colour calibration parameters which characterise chromatic properties of the user's display device.

The inventor has realised that unique hue settings may be used as an internal standard to calibrate visual display units. This eliminates the need for an external standard (e.g. a printed colour chart).

Suitably, steps a and b are repeated thirteen or more times.

Suitably, the three unique hues are selected from the hues red, green, blue and yellow. Suitably, the three unique hues are red, green and blue. Alternatively, the three unique hues may be red, green and yellow. In a further alternative four unique hues may be used, i.e. red, green blue and yellow.

Suitably, the display device colour calibration defines the orientation of unique hue planes, in a physiologically defined colour space, of the display device.

Suitably, the display device colour calibration defines offsets of the display device.

Suitably, the display device colour calibration defines gain of the display device.

Suitably, the display device colour calibration defines a value indicative of the non-linearity of the display device.

Suitably, the display device colour calibration is stored as a file.

Suitably, the stored display device colour calibration file is associated with an image found to have substantially veridical colour when viewed on the user's display device.

Suitably, the stored display device colour calibration file is retained for future use.

Suitably, the method further comprises receiving an image together with a set of image colour calibration parameters, the image colour calibration parameters characterising chromatic properties of an originator's display device upon which the image was formed to have substantially veridical colour, using the image colour calibration parameters and the display device colour calibration parameters to generate a transformation, the transformation indicating adjustments to be made to the image in order that the image be displayed on the user's display device with substantially veridical colour, applying the transformation to the image and displaying the resulting image on the user's display device.

Suitably, the transformation determines how pixel values of the image should be transformed to account for chromatic properties of the user's display device.

Suitably, the transformation maps unique hue planes generated on the originator's display device to unique hue planes generated on the user's display device.

Suitably, the image colour calibration parameters comprise a stored display device colour calibration file for the originator's display device.

Suitably, the colour regions are patches arranged as an annulus.

Suitably, the display device is a visual display unit.

Suitably, the display device is a printer.

Suitably, steps a and b are repeated for a fourth unique hue.

The invention also provides a colour calibration file which defines the orientation of unique hue planes of a display device.

Suitably, the colour calibration file defines offsets of the display device.

Suitably, the colour calibration file defines gain of the display device.

Suitably, the colour calibration file defines a value indicative of the non-linearity of the display device.

The invention also provides a colour calibration apparatus for a user's display device comprising:
   a. means for displaying a set of colour regions each region having a slightly different colour;
   b. means for receiving an input from a user, the input indicating which colour region is considered by the user to represent a unique hue;
   c. means for repeating steps a and b for three different unique hues at different intensities; and
   d. means for using the user's selections of unique hues to generate a set of display device colour calibration parameters which characterise chromatic properties of the user's display device.

A specific embodiment of the invention will now be described by way of example only with reference to the following accompanying drawings, in which.

An originator C creates an image on his/her visual display unit A. The originator C may for example be an employee of a company which sells clothes on the World Wide Web, and the image may be for example an item of clothing. The originator C during creation of the image checks that the colour of the image is correct, for example by checking that the colour of the image of the item of clothing corresponds to the colour of the item of clothing itself.

Once the originator C is satisfied with the colour appearance of the image, he/she performs a colour calibration for the visual display unit A.

The colour calibration is based upon four hues: red, green, yellow and blue (these are known as the unique hues). It is known that the unique hues are approximately constant across cultures, gender, age, race etc. That is, given the same visual display unit, most human observers with normal colour vision make very similar and accurate judgements about the unique hues. In other words, when asked to select a specific unique hue for a visual display unit, human observers pick the same combination of intensities of the red, green, and blue phosphor of the visual display unit. This constancy is exploited by the invention, which uses the constancy as a standard when calibrating different visual display systems.

Figure 1:
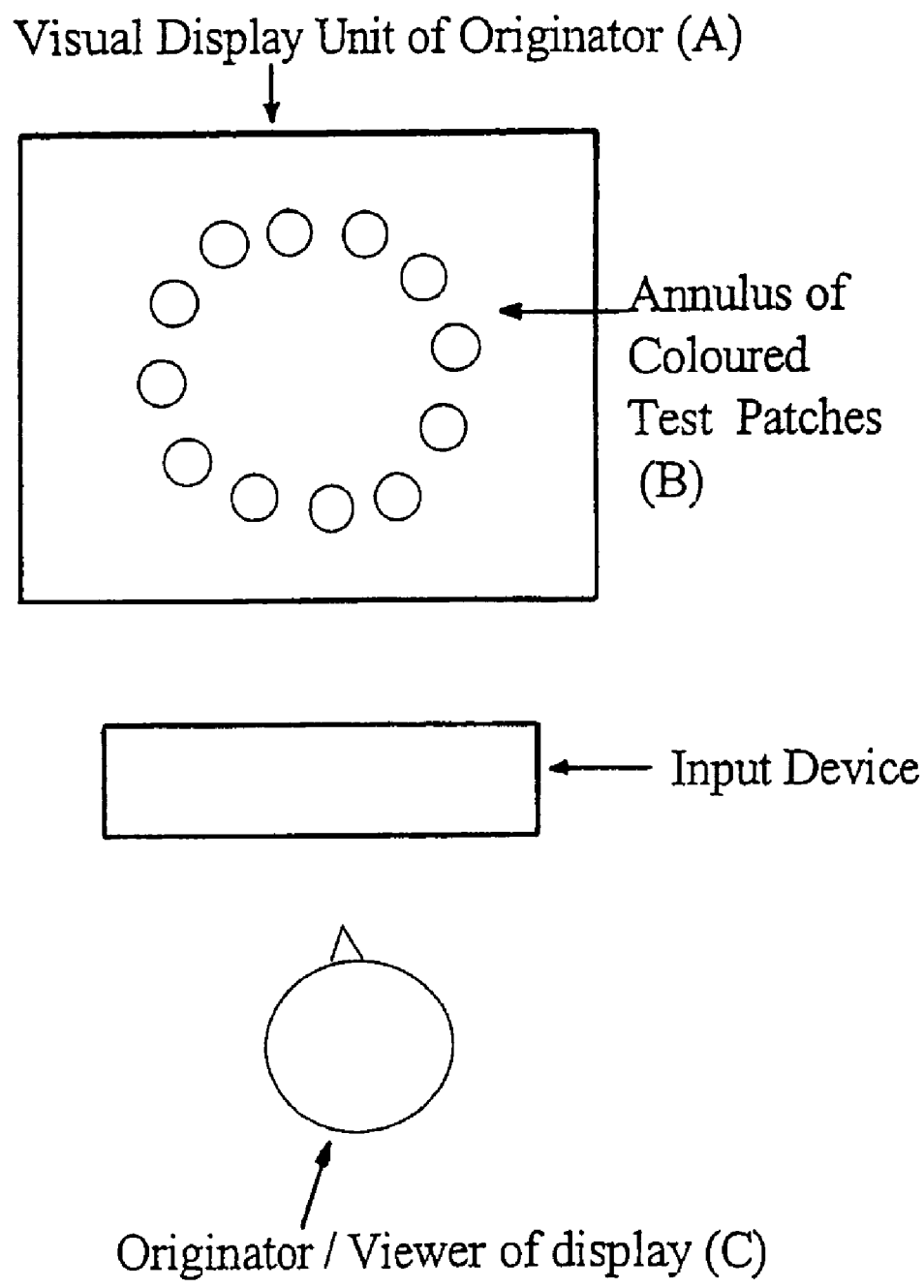
FIG. 1 is a schematic representation of a calibration test according to the invention, as seen on a visual display unit of an originator.

Referring to FIG. 1, an annulus of similarly coloured test patches B is displayed on the visual display unit A of the originator C. The originator C selects the patch most similar to the unique hue, for example denoted by G in FIG. 2. The originator C will use an input device, for example a computer mouse, to make his/her selection. The selection is performed for three unique hues; hence the annulus B will always consist of bluish, reddish, or greenish colours and the task of the originator C is always to select the patch that is closest to the unique blue, red, or green, respectively. This is repeated five times for different intensities of each of unique blue, red, and green.

It is important to note that the originator C is not being asked to compare the coloured test patches with a set of printed reference colours, or some other set of reference colours provided to the originator. Instead, the originator C is simply asked to select for example the red colour patch which is 'neither yellow nor blue'. Similarly, unique green is the green colour patch which is 'neither yellow not blue', whereas unique blue is the blue colour patch which is 'neither red nor green'. The calibration therefore takes advantage of the ability of human observers with normal colour vision to make very similar and accurate judgements about the unique hues.

As previously mentioned, the calibration procedure requires a selection to be made by the originator C of a colour patch for the unique hues red, green and blue (unique yellow is not used in this example). The RGB values (the intensities of the red, green, and blue phosphor) which gave rise to each of the unique colours, as selected by the originator, are accessed and are used to generate a calibration file H for the originator's visual display unit. This is shown schematically in FIG. 2. The calibration file H contains all the relevant information about the originator's visual display unit A. The calibration file H is associated with the image, so that when the image is sent to a user F the calibration file H is also sent to the user F.

The image that was created by originator A is received, together with the originator's calibration file H, by user F. The image and file transmission is typically via the Internet, for example by downloading, ftp or email. In general, the user F views the image on a visual display unit D which has different characteristics to the visual display unit A used by the originator.

Figure 3:
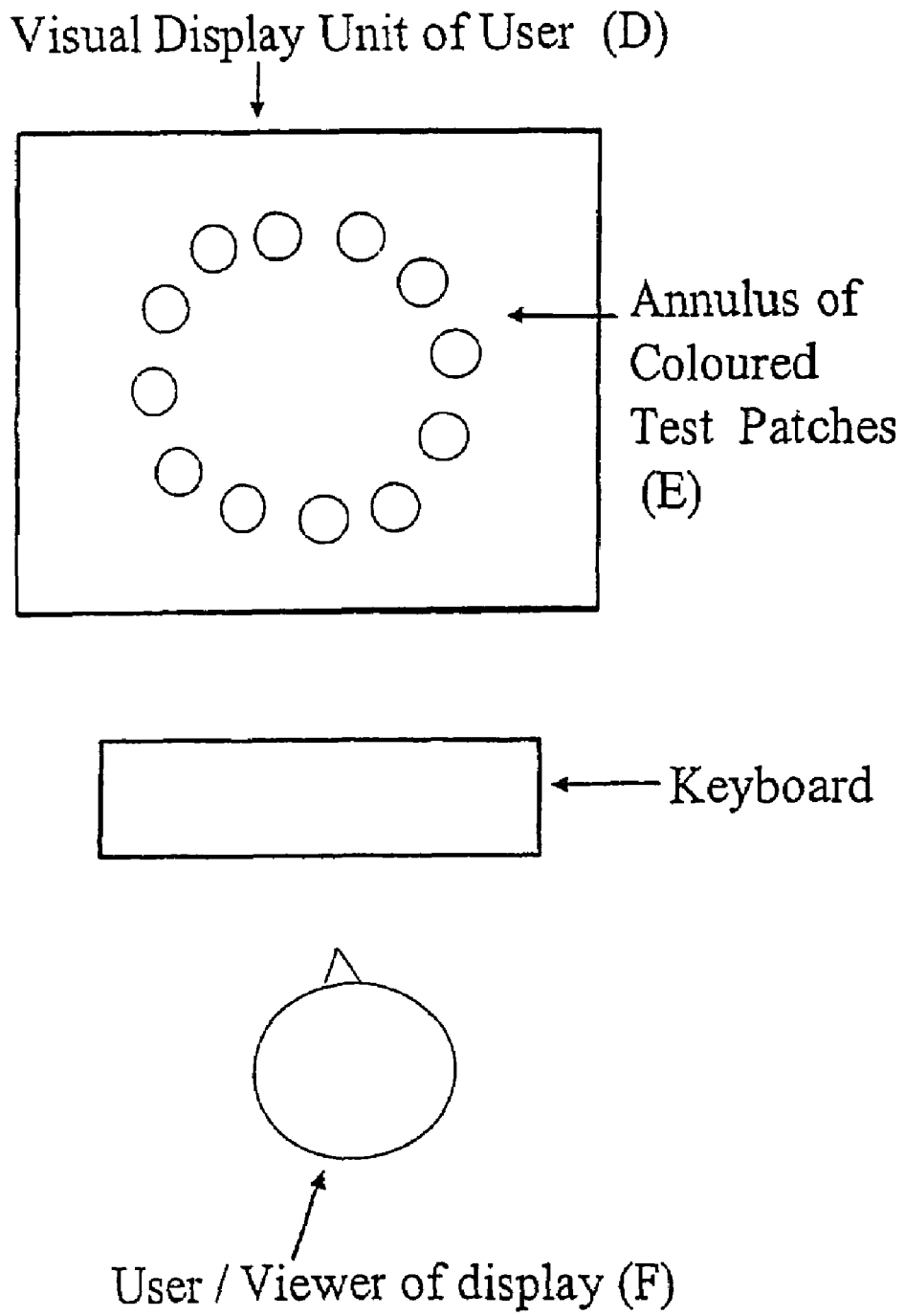
FIG. 3 is a schematic representation of the calibration test as seen on a visual display unit of a user.
Figure 4:
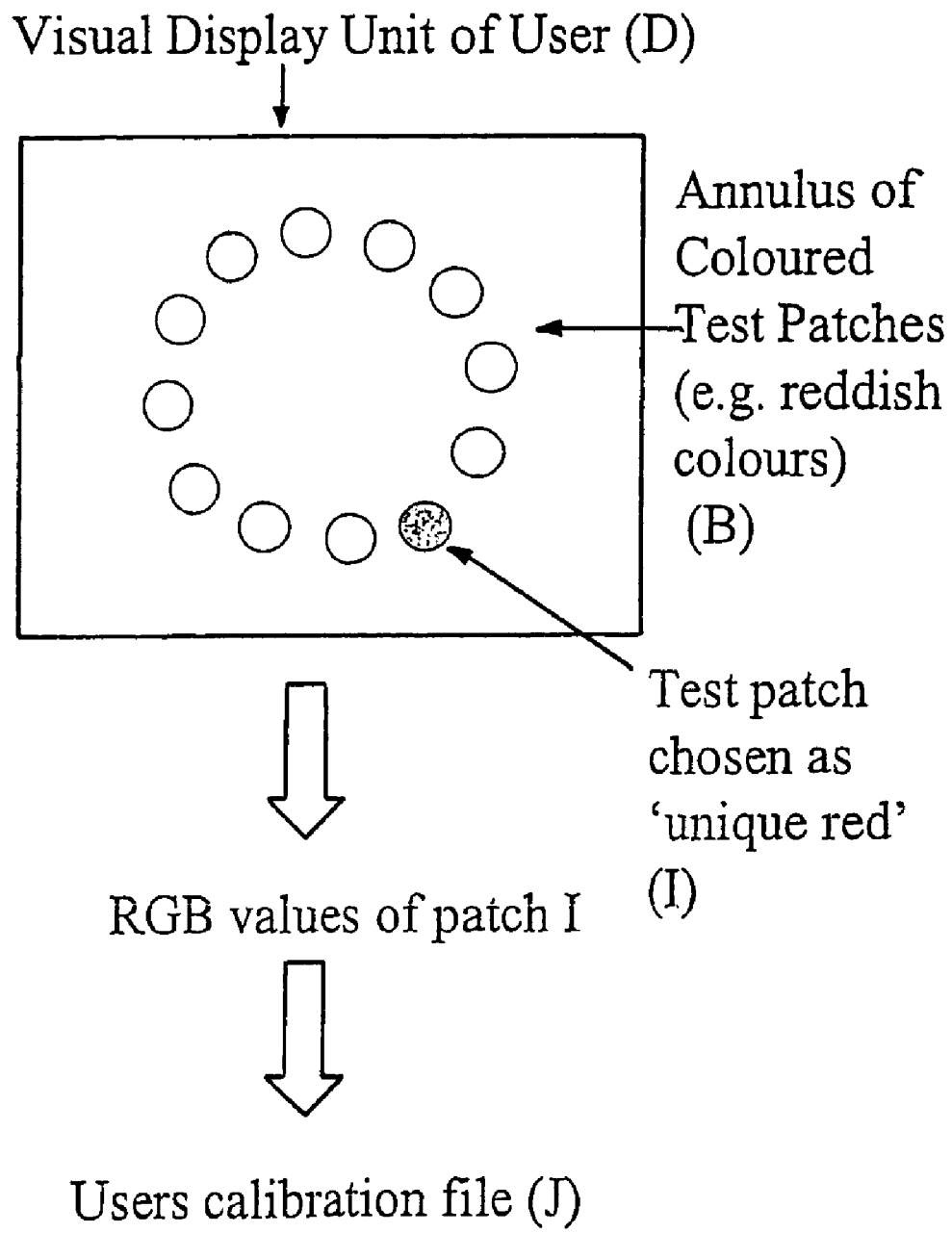
FIG. 4 is a schematic representation of the outcome of a typical calibration test performed by the user.

Upon receiving the image, the user F is asked whether he/she would like to perform a colour calibration so that/the colour of the viewed image is as intended by the originator. Upon request by the user, the calibration procedure is performed by user F on the visual display unit D, as shown in FIG. 3. An annulus of similarly coloured test patches E is displayed and the user F selects the patch most similar to the unique hue, for example denoted by I in FIG. 4. This selection by the user F is again made by an input device, for example a computer mouse. The RGB values of the selected patch are stored. The process is repeated to generate a calibration file J for the unique hues red, green and blue.

Figure 5:
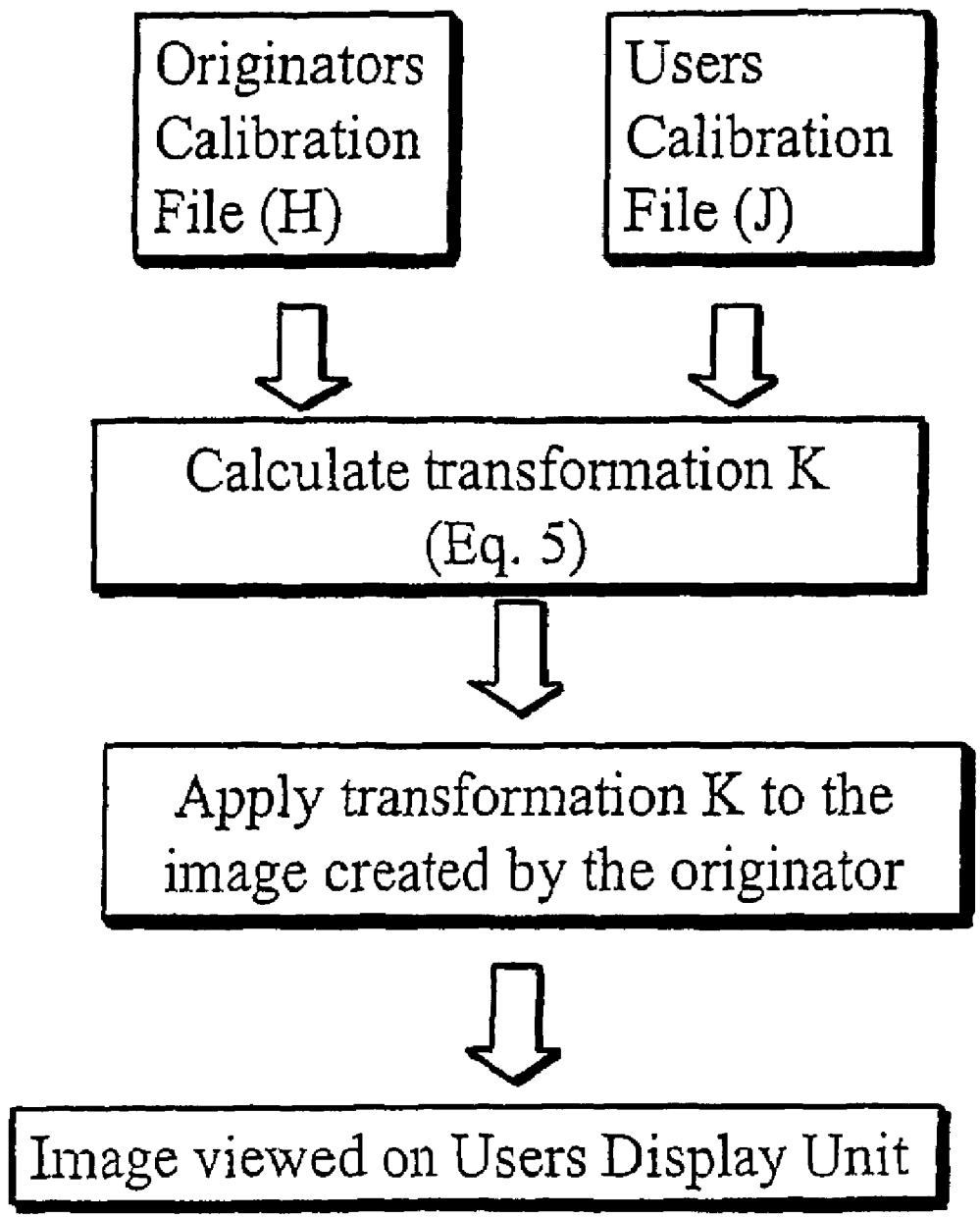
FIG. 5 is a flow chart of the calculation and the calibration steps.

As shown in FIG. 5, both calibration files H and J are accessed, and a transformation K is estimated based upon the RGB values corresponding to the unique hues on the user's display unit D and the originator's display unit A. This transformation K is applied to the RGB values of the user's visual display unit.

Application of the transformation K to the RGB values of the visual display unit D of the user F will result in the image created by the originator C having an appearance identical to the image viewed by the user F. Hence a true device-independent calibration has been achieved.

The calibration will now be described in more detail:

For each of the three unique hues, a plane in a physiologically-defined three-dimensional space is determined which fits to the observer's unique hue settings. The dimensions of the three-dimensional space are the light intensities that correspond to the RGB values. The RGB values are device-specific, and typically range from 0 to 255 (8 bit). Thus each unique hue setting (e.g. unique red) is described by an RGB vector (for example R=230, G=150, B=200).

The relationship between the light output (intensity) of each phosphor and the internal pixel value (R,G,B) is non-linear and is described by a transfer function of the following form:

$$\text{Intensity } I \propto (k \cdot \text{Pixel\_value} + l)^\gamma \quad \text{(Eq. 1)}$$

where k and l are the system gain and offset values; the gamma value reflects the non-linearity. The gain (k) and the offset (l) are to some extent under the control of the user in the form of contrast and brightness knobs. In Cathode-Ray-Tube based monitors, the non-linearity ($\gamma$) reflects the non-linear relationship between the voltage applied to the CRT electron-gun and the visible radiant energy (light output). For most CRT-based monitors the gamma value is between 1.8 and 2.2. Other display devices may have entirely different gamma values or, more generally, different transfer functions.

The unique hues may be described as planes in non-linear RGB space, where the non-linear RGB space is light output rather than internal pixel values. Given the transfer function (Eq. 1), the planes of the unique hues in non-linear RGB space are defined by a set of equations of the form:

Unique Red Plane $$(\tilde{R}): a_{\tilde{R}}(k_R R + l_R)^\gamma + b_{\tilde{R}}(k_G G + l_G)^\gamma + c_{\tilde{R}}(k_B B + l_B)^\gamma + d_{\tilde{R}} = 0$$

Unique Green Plane $$(\tilde{G}): a_{\tilde{G}}(k_R R + l_R)^\gamma + b_{\tilde{G}}(k_G G + l_G)^\gamma + c_{\tilde{G}}(k_B B + l_B)^{\gamma B} + d_{\tilde{G}} = 0$$

Unique Blue Plane $$(\tilde{B}): a_{\tilde{B}}(k_R R + l_R)^\gamma + b_{\tilde{B}}(k_G G + l_G)^\gamma + c_{\tilde{B}}(k_B B + l_B)^\gamma + d_{\tilde{B}} = 0$$

Since each of the unique hue planes ($i = <\tilde{R}, \tilde{G}, \tilde{B}>$) contains the origin (black), the constants ($d_i$) are set to zero. One parameter can be eliminated by dividing the equations by $c_i$ which further simplifies the equations to the following:

Unique Red Plane ($\tilde{R}$):

$$\frac{a_{\tilde{R}}}{c_{\tilde{R}}}(k_R R + l_R)^\gamma + \frac{b_{\tilde{R}}}{c_{\tilde{R}}}(k_G G + l_G)^\gamma + (k_B B + l_B)^\gamma = 0$$

Unique Green Plane ($\tilde{G}$):

$$\frac{a_{\tilde{G}}}{c_{\tilde{G}}}(k_R R + l_R)^\gamma + \frac{b_{\tilde{G}}}{c_{\tilde{G}}}(k_G G + l_G)^\gamma + (k_B B + l_B)^\gamma = 0$$

Unique Blue Plane ($\tilde{B}$):

$$\frac{a_{\tilde{B}}}{c_{\tilde{B}}}(k_R R + l_R)^\gamma + \frac{b_{\tilde{B}}}{c_{\tilde{B}}}(k_G G + l_G)^\gamma + (k_B B + l_B)^\gamma = 0$$

To further simplify the equations we re-define $a_i$ as $a_i/c_i$, and $b_i$ as $b_i/c_i$ and replace the non-linear transfer function (Eq 1) with the intensity I:

$$\begin{bmatrix} a_R & b_R & 1 \\ a_{\tilde{G}} & b_{\tilde{G}} & 1 \\ b_{\tilde{G}} & b_{\tilde{B}} & 1 \end{bmatrix} \begin{bmatrix} I_R \\ I_G \\ I_B \end{bmatrix} = \begin{bmatrix} 0 \\ 0 \\ 0 \end{bmatrix} \quad \text{(Eq. 2)}$$

Therefore, for each of the three unique hue planes, we need to estimate the vector $[a_i, b_i, 1]$, which in total requires six parameters. The vector $[a_i, b_i, 1]$ is normal to the respective unique hue plane. The remaining seven unknown parameters, namely the three gain values ($k_R, k_G, k_B$), the three offsets ($l_R, l_G, l_B$), and the gamma value ($\gamma$) are the same in all three equations resulting in a total of 13 parameters.

To estimate the 13 parameters, the observer makes five settings for each of the unique hues resulting in a set of 15 equations. A standard minimisation procedure is used to estimate the 13 parameters from the 15 equations. The standard minimisation procedure may be for example the Nelder-Mead simplex method (which is used by the proprietary software MATLAB), the gradient descent method or Newton's method. The 13 estimated parameters completely characterise the chromatic properties of the display device of the originator. The three normal vectors $[a_i, b_i, 1]$ determine the orientation of the unique hue plane's of display device A; the offsets ($l_R, l_G, l_B$), the gain values ($k_R, k_G, k_B$), and the gamma value ($\gamma$) characterise the non-linearity of the display device A.

Figure 2:
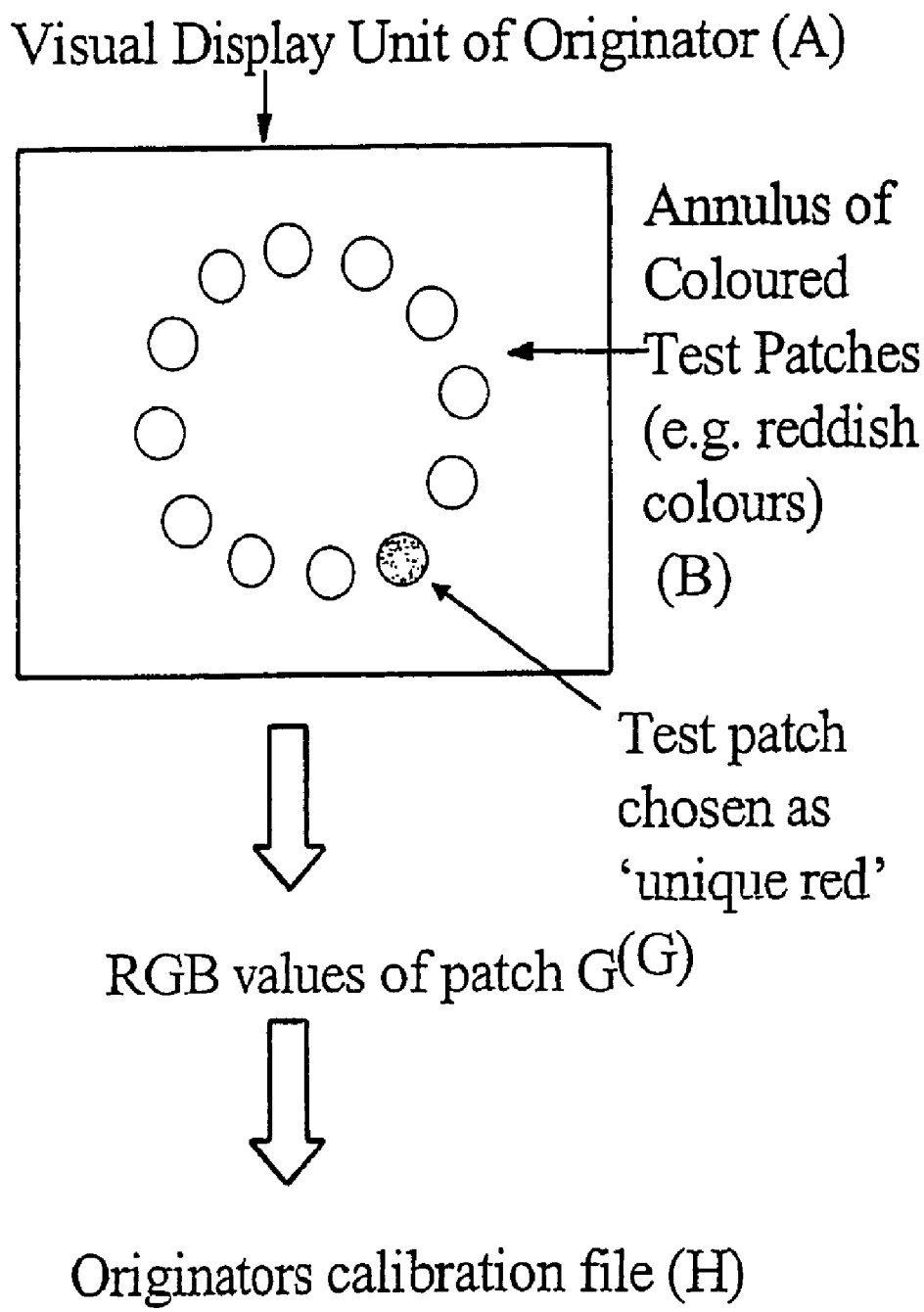
FIG. 2 is a schematic representation of the outcome of a typical calibration test performed by the originator.

The 13 parameters are stored in the originator's calibration file H (see FIG. 2). The originator's calibration file H contains all the relevant information about the visual display unit A and is sent together with the image to user F.

The user F carries out the same calibration as described above for his/her display device D. Using the technique described above, a set of equations analogous to Eq. 2 are obtained for display device D:

$$\begin{bmatrix} a'_R & b'_R & 1 \\ a'_{\tilde{G}} & b'_{\tilde{G}} & 1 \\ b'_{\tilde{G}} & b'_{\tilde{B}} & 1 \end{bmatrix} \begin{bmatrix} I'_R \\ I'_G \\ I'_B \end{bmatrix} = \begin{bmatrix} 0 \\ 0 \\ 0 \end{bmatrix} \quad \text{(Eq. 3)}$$

The 13 parameters referred to above in relation to display device A are estimated for display device D and are stored in the user's calibration file J. The user's calibration file J is the profile for display unit D of user F and contains all the relevant information required for display unit D.

The calibration procedure takes both calibration files H and J, and finds the transformation that maps the unique hue planes generated on display unit A into the unique hue planes generated on display unit D (this is shown schematically in FIG. 5). From Eq. 2 and Eq. 3 it follows that:

$$\begin{bmatrix} a_R & b_R & 1 \\ a_{\tilde{G}} & b_{\tilde{G}} & 1 \\ b_{\tilde{G}} & b_{\tilde{B}} & 1 \end{bmatrix} \begin{bmatrix} I_R \\ I_G \\ I_B \end{bmatrix} = \begin{bmatrix} a'_R & b'_R & 1 \\ a'_{\tilde{G}} & b'_{\tilde{G}} & 1 \\ b'_{\tilde{G}} & b'_{\tilde{B}} & 1 \end{bmatrix} \begin{bmatrix} I'_R \\ I'_G \\ I'_B \end{bmatrix}$$

In the following the coefficient matrices consisting of the normal vectors for display unit A and D are denoted as $N_A$ and $N_D$ respectively. The intensity vectors for display unit A and D are denoted as $I_A = [I_R, I_G, I_B]$ and $I_D = [I_{R'}, I_{G'}, I_{B'}]$, respectively. Since $$N_A I_A = N_D I_D,$$

it follows that $$I_D = N_D^{-1} N_A I_A,$$

where $N_A^{-1}$ is the inverse of $N_A$. Defining $N_{AD} = N_A^{-1} N_D$ results in the following:

$$I_D = N_{AD} I_A \quad \text{(Eq. 4)}$$

$N_{AD}$ is a matrix that maps the intensities of visual display unit A into the intensities of visual display unit D. Equation 4 determines how the intensities of visual display unit D need to be transformed so that an image on display unit A will appear identical to the same image viewed on display unit D.

Since the calibration procedure has no access to the intensities (light outputs) of each colour channel but only to the internal pixel values (R,G,B) equation 4 needs to be solved for the pixel values (R,G,B). Since the transfer function relating the RGB pixel values to the intensities has been estimated (from Eq. 1 and 2) we can substitute the intensities with the actual pixel values (R,G,B). From Equation 1 and 4 it follows:

$$\left( \begin{bmatrix} k_{R'} R' + l_{R'} \\ k_{G'} G' + l_{G'} \\ k_{B'} B' + l_{B'} \end{bmatrix} \right)^{\gamma'} = [N_{AD}] \left( \begin{bmatrix} k_R R + l_R \\ k_G G + l_G \\ k_B B + l_B \end{bmatrix} \right)^\gamma$$

where the non-linearity $\gamma$ is applied to each of the three vector entries separately. Rewriting the left-hand side yields $$\left( \begin{bmatrix} k_{R'} R' \\ k_{G'} G' \\ k_{B'} B' \end{bmatrix} + \begin{bmatrix} l_{R'} \\ l_{G'} \\ l_{B'} \end{bmatrix} \right)^{\gamma'} = [N_{AD}] \left( \begin{bmatrix} k_R R + l_R \\ k_G G + l_G \\ k_B B + l_B \end{bmatrix} \right)^\gamma$$

By taking both sides of the equation to the power of ($1/\gamma'$) results in $$\left( \begin{bmatrix} k_{R'} R' \\ k_{G'} G' \\ k_{B'} B' \end{bmatrix} + \begin{bmatrix} l_{R'} \\ l_{G'} \\ l_{B'} \end{bmatrix} \right) = \left\{ [N_{AD}] \left( \begin{bmatrix} k_R R + l_R \\ k_G G + l_G \\ k_B B + l_B \end{bmatrix} \right)^\gamma \right\}^{1/\gamma'}$$

and by subtracting the offset vector we obtain:

$$\begin{bmatrix} k_{R'}R' \\ k_{G'}G' \\ k_{B'}B' \end{bmatrix} = \left\{ [N_{AD}] \left( \begin{bmatrix} k_R R + l_R \\ k_G G + l_G \\ k_B B + l_B \end{bmatrix} \right)^{\gamma} \right\}^{1/\gamma'} - \begin{bmatrix} l_{R'} \\ l_{G'} \\ l_{B'} \end{bmatrix}$$

We can write the gain coefficients as a diagonal matrix:

$$\begin{bmatrix} k_{R'} & 0 & 0 \\ 0 & k_{G'} & 0 \\ 0 & 0 & k_{B'} \end{bmatrix} \begin{bmatrix} R' \\ G' \\ B' \end{bmatrix} = \left\{ [N_{AD}] \left( \begin{bmatrix} k_R R + l_R \\ k_G G + l_G \\ k_B B + l_B \end{bmatrix} \right)^{\gamma} \right\}^{1/\gamma'} - \begin{bmatrix} l_{R'} \\ l_{G'} \\ l_{B'} \end{bmatrix}$$

Multiplying the equation with the inverse of the gain matrix yields:

$$\begin{bmatrix} R' \\ G' \\ B' \end{bmatrix} = \begin{bmatrix} 1/k_{R'} & 0 & 0 \\ 0 & 1/k_{G'} & 0 \\ 0 & 0 & 1/k_{B'} \end{bmatrix} \left( \left\{ [N_{AD}] \left( \begin{bmatrix} k_R R + l_R \\ k_G G + l_G \\ k_B B + l_B \end{bmatrix} \right)^{\gamma} \right\}^{1/\gamma'} - \begin{bmatrix} l_{R'} \\ l_{G'} \\ l_{B'} \end{bmatrix} \right) \quad \text{(Eq. 5)}$$

The left-hand side of Equation 5 are the unknown RGB values of the display unit D of the user F. The right-hand side of the equation contains only known parameters. This transformation is called K in FIG. 5 and is based on the two calibration files H and J.

The transformation K (defined in Equation 5) determines how the pixel values (R, G, B) of an image generated on display unit A need to be transformed to account for the different chromatic properties of the two display units. After the transformation K has been applied to the RGB values of the image, the image created by originator C on visual display unit A will look identical to the image viewed by the user F on visual display unit D. Hence the calibration procedure has achieved a true device-independent calibration.

The calibration procedure need only be carried out once for any given visual display device, the resulting calibration file being stored for future use (the characteristics of the display device will not change significantly).

The invention may be used for any visual display device, and is not restricted to traditional cathode ray tube (CRT) displays. The invention may for example be used for liquid crystal displays (LCDs).

The calibration procedure may be used for image or video applications involving the world-wide web. It may also be used for image transfer using ftp or email when a veridical image representation is required.

The calibration procedure can run on any platform (e.g. Windows, UNIX or a Macintosh operating system) since it can be implemented using JAVA or CGI.

The calibration procedure does not require a visual display device to have a specific colour resolution. It is usually the case that 255 different pixel values are available for each of the three colour channels of a visual display device. However, the calibration procedure can be used for devices with a higher or a lower resolution.

Any suitable input device may be used by a user to select the unique hues, for example a keyboard, a mouse, a joystick, touch screen, etc.

The calibration procedure does not depend on the originator and the user having similar display devices. For example, the originator may use a CRT based monitor, whereas the user may view the image on a LCD panel. The transformation K is general and does not rely on similar spectral power distributions for both display devices. Since the calibration procedure is device independent, it may be applied to future display devices having colour channels with different chromatic properties.

The derivation of the transformation K which provides mapping of colours between display devices is presented as an example. It will be appreciated that other algorithms could be used to find the mapping. Any mapping should be based on the unique hues settings and should map the RGB space from device A into the RGB space of device D.

The described embodiment of the invention includes the assumption that the non-linearity (gamma values in equation 1) is the same in the colour channels: (e.g. red, green, blue phosphors. If the gamma values differ in the n (usually 3) chromatic channels, (n−1) more parameters need to be estimated.

The transfer function specified in equation 1 may be of a different nature for different display systems. The transfer function specified in equation 1 describes well the light output for currently available CRT-based display devices. It will be appreciated that other transfer functions may be used as appropriate for other types of display device, and that the calibration procedure will work in the same manner. More parameters may be required to estimate the transfer function.

Although the described example uses the three unique hues red, green and blue, it will be appreciated that the invention could be implemented using the unique hues red, green and yellow. It is noted that unique yellow and unique blue lie on a plane in colour space and are linearly dependent. Thus, all four unique hues may be used to obtain a more precise estimate of the unique yellow-blue plane.

The e-calibration tool can be adapted to be used for device-independent printer calibration. Only a minor modification of the calibration process is required. The following steps are involved:

(i) The originator generates the image and the calibration file (H) for display unit A (ii) The user receives the image and performs a unique hue selection task using a printed version of the annuli of coloured patches (FIG. 1).

(iii) A calibration file is generated for user F; this calibration file is based on the perceptual judgements of the printed stimuli, rather than stimuli viewed on a monitor. This Calibration File (J) contains the profile of the printer and all the relevant information about the chromatic properties of the printer.

(iv) The transformation K is again calculated from the two device profiles H and J.

(v) The transformation K is applied to the pixel values in each of the three colour channels. After the correction with the transformation K the printed version of the image should look identical to the image viewed on the visual display unit.

The invention claimed is:

1. A method of colour calibration, the method comprising for a user's display device:

a. displaying a set of test colour regions to a user, each region having a slightly different colour;

b. receiving an input from the user, the input indicating which colour region among the set of test colour regions is considered by the user to represent a unique hue, the unique hue being one of unique yellow, unique red, unique green, and unique blue, unique yellow being a yellow which is neither red or green, unique red being a red which is neither yellow or blue, unique green being a green which is neither yellow or blue, and unique blue being a blue which is neither red or green;

c. repeating steps a and b for at least three different unique hues at different intensities; and d. using the user's selections of the at least three different unique hues to generate a set of display device colour calibration parameters which characterise chromatic properties of the user's display device.

2. A method according to claim 1, wherein steps a and b are repeated thirteen or more times.

3. A method according to claim 1, wherein the at least three different unique hues are unique red, unique green and unique blue.

4. A method according to claim 1, wherein the at least three different unique hues are unique red, unique green and unique yellow.

5. A method according to claim 1, wherein the user's selections of four unique hues are used, the four unique hues being unique red, unique green, unique blue and unique yellow.

6. A method according to claim 1, wherein the display device colour calibration defines the orientation of unique hue planes, in a physiologically defined colour space, of the display device.

7. A method according to claim 1, wherein the display device colour calibration defines offsets of the display device.

8. A method according to claim 1, wherein the display device colour calibration defines gain of the display device.

9. A method according to claim 1, wherein the display device colour calibration defines a value indicative of the non-linearity of the display device.

10. A method according to claim 1, wherein the display device colour calibration is stored in a file.

11. A method according to claim 10, wherein the stored display device colour calibration file is associated with an image found to have substantially veridical colour when viewed on the user's display device.

12. A method according to claim 10, wherein the stored display device colour calibration file is retained for future use.

13. A method according to claim 1, wherein the method further comprises receiving an image together with a set of image colour calibration parameters, the image colour calibration parameters characterising chromatic properties of an originator's display device upon which the image was found to have substantially veridical colour, using the image colour calibration parameters and the display device colour calibration parameters to generate a transformation, the transformation indicating adjustments to be made to the image in order that the image be displayed on the user's display device with substantially veridical colour, applying the transformation to the image and displaying the resulting image on the user's display device.

14. A method according to claim 13, wherein the transformation determines how pixel values of the image should be transformed to account for chromatic properties of the user's display device.

15. A method according to claim 13, wherein the display device colour calibration defines the orientation of unique hue planes, in a physiologically defined colour space, of the display device; and wherein the transformation maps unique hue planes generated on the originator's display device to unique hue planes generated on the user's display device.

16. A method according to claim 13, wherein the stored display device colour calibration file is associated with an image found to have substantially veridical colour when viewed on the user's display device; and wherein the image colour calibration parameters comprise a stored display device colour calibration file for the originator's display device.

17. A method according to claim 1, wherein the colour regions are patches arranged as an annulus.

18. A method according to claim 1, wherein the display device is a visual display unit.

19. A method according to claim 1, wherein the display device is a printer.

20. A method according to claim 1, wherein steps a and b are repeated for a fourth unique hue.

21. A colour calibration apparatus for a user's display device comprising:

a. means for displaying a set of test colour regions to a user, each region having a slightly different colour;

b. means for receiving an input from the user, the input indicating which colour region among the set of test colour regions is considered by the user to represent a unique hue, the unique hue being one of unique yellow, unique red, unique green, and unique blue, unique yellow being a yellow which is neither red or green, unique red being a red which is neither yellow or blue, unique green being a green which is neither yellow or blue, and unique blue being a blue which is neither red or green;

c. means for repeating steps a and b for at least three different unique hues at different intensities; and d. means for using the user's selections of the at least three different unique hues to generate a set of display device colour calibration parameters which characterise chromatic properties of the user's display device.

22. A method according to claim 21, wherein the at least three different unique hues are unique red, unique green and unique blue.

23. A method according to claim 21, wherein the at least three different unique hues are unique red, unique green and unique yellow.

24. A method according to claim 11, wherein the stored display device colour calibration file is retained for future use.

25. A method according to claim 14, wherein the display device colour calibration defines the orientation of unique hue planes, in a physiologically defined colour space, of the display device; and wherein the transformation maps unique hue planes generated on the originator's display device to unique hue planes generated on the user's display device.

* * * * *